(12) United States Patent
Nee

(10) Patent No.: US 8,839,341 B1
(45) Date of Patent: Sep. 16, 2014

(54) EXTERNALLY POWERED RADIO FREQUENCY MODULATOR

(71) Applicant: Noel Nee, Johns Creek, GA (US)

(72) Inventor: Noel Nee, Johns Creek, GA (US)

( * ) Notice: Subject to any disclaimer, the term of this patent is extended or adjusted under 35 U.S.C. 154(b) by 35 days.

(21) Appl. No.: 13/786,651

(22) Filed: Mar. 6, 2013

(51) Int. Cl.
*H04N 7/16* (2011.01)
*H04N 5/262* (2006.01)

(52) U.S. Cl.
CPC .................................. *H04N 5/262* (2013.01)
USPC .......................................... 725/149; 725/151

(58) Field of Classification Search
CPC ..................................................... H04N 5/262
USPC ................................................ 725/149, 451
See application file for complete search history.

(56) References Cited

U.S. PATENT DOCUMENTS 8,516,529 B2 * 8/2013 Lajoie et al. ................ 725/87
2011/0107379 A1 * 5/2011 Lajoie et al. ................ 725/87

* cited by examiner

*Primary Examiner* — Kieu Oanh T Bui
(74) *Attorney, Agent, or Firm* — Wang Law Firm, Inc.; Li K. Wang; Stephen Hsu

(57) ABSTRACT

An apparatus for enabling display of composite audio and video (AV) signals on a television set with a coaxial input connector is disclosed. The apparatus receives composite AV signals through a single tip AV connector and delivers AV signal on a coaxial output. The apparatus receives low voltage DC power from a USB connector.

16 Claims, 3 Drawing Sheets

US 8,839,341 B1

EXTERNALLY POWERED RADIO FREQUENCY MODULATOR

FIELD OF THE INVENTION

The present invention generally relates to radio frequency modulation, and more specifically to an external universal serial bus (USB) powered radio frequency modulator.

BACKGROUND OF THE INVENTION

With the development of the digital television signal broadcasting and also the development of LED, LCD, and plasma digital television sets, many old, but functional analog television sets with coaxial cable inputs have gradually become obsolete. The subscription-based TV service providers ("service providers") have been providing a coaxial cable output on their set-top-boxes, so their broadcasted programs can be watched on the older television sets without the use of composite audio/video (AV) signal inputs. However, the support for the older television sets increases the cost of the set-top-boxes.

Some solutions have been provided to convert composite AV signals into coaxial AV signals for use by the older television sets and they usually involve a bulgy converter box that takes composite AV signals from the set-top-box and outputs a coaxial AV signal. This converter box adds cost to the service providers.

Therefore, it is desirable to offer a low cost solution that enables the service providers to continue to support the older television sets and it is to this solution the present application is primarily directed to.

SUMMARY OF THE INVENTION

The present invention has been made to overcome the aforementioned disadvantages of conventional methods. The primary objective of the present invention is to provide a simple and low cost apparatus that enables an older television set to watch programming that is originally broadcasted through digital signals.

The present invention also provides a method for modulating composite audio signal and video signal into an audio and video signal on a coaxial output. The method comprises receiving, by a USB connector, a low voltage DC power from an external source such as the set-top-box, powering a modulating circuit by the low voltage DC power, receiving a composite audio signal to form a received audio signal, receiving a composite video signal to form a received video signal, modulating the received audio signal and the received video signal to form a combined audio and video signal, select the channel 3/4 switch, and outputting the combined audio and video signal on a coaxial output connector, and display the output analog TV signal on either channel 3 or channel 4 of the TV set.

In another embodiment, the present invention provides an apparatus, for modulating composite audio signal and video signal into an audio and video signal on a coaxial output. The apparatus comprises a USB input for receiving a low voltage DC power, an audio signal input for receiving an audio signal, a video signal input for receiving a video signal, a coaxial signal output, and a modulating circuit, powered by the low voltage DC power, for modulating the audio signal and the video signal into a combined audio and video signal and outputting the combined audio and video signal on the coaxial signal output.

In yet another embodiment, the present invention provides a system, for modulating digital AV signals received from a subscription-based service onto a composite AV signal for displaying on a television set with only a coaxial input connector. The system comprises a set-top-box and a radio frequency modulator. The set-top-box receives the digital AV signals from an external source and outputs a composite audio signal and a composite video signal and has a universal serial bus (USB) output connector. The radio frequency (RF) modulator receives the composite audio signal and the composite video signal from the set-top-box and outputs a coaxial AV signal. The RF modulator comprises a single tip connector, a mini USB input connector, a modulating circuit, and a coaxial output connector. The single tip connector receives a single tip AV connector carrying the composite audio signal and the composite video signal and the mini USB input connector connects, through an external USB cable, to the USB output connector on the set-top-box. The RF modulator receives a low voltage DC power through the external USB cable from the USB output connector on the set-top-box and the RF modulator has no other power source. The modulating circuit modulates the composite audio signal and the composite video signal into the coaxial AV signal and the coaxial output connector outputs the coaxial AV signal.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
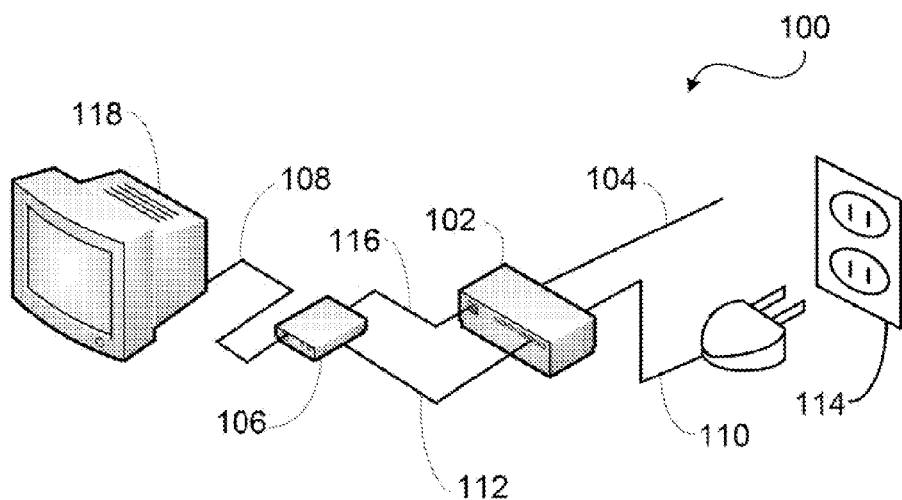
FIG. 1 shows a schematic 100 of a composite AV signal conversion according to the present invention.

The present invention provides an easy and simple solution that helps the subscription-based TV service providers to lower the cost of their set-top-boxes and at the same time still support the customers with older television sets. FIG. 1 is a schematic 100 of a setting for converting digital AV signals 104 into a coaxial AV signal 108 for use by a TV 118 with only a coaxial input. The digital AV signal 104 is received from a subscription-based TV service provider. The digital AV signal 104 is received by a set-top-box 102 that provides several connections, such as composite AV connectors, RCA (yellow/red/white) connectors, USB connector, etc. The set-top-box 102 is generally powered by a power cord 110 connected to a power outlet 114.

The connectors on the set-top-box 102 provide AV signals in different formats, but the set-top-box 102 does not provide a connector for the coaxial cable. The support for an older television set 118 is provided through the modulator 106 of the present invention. A cable 116 with two connectors, one for the composite video signal and one for the composite audio signal, on one end and another end with a single pin AV connector connects the set-top-box 102 to the modulator 106. The modulator 106 receives low voltage DC power from a USB port, to which a USB cable 112 is connected. The USB cable 112 connects the modulator 106 to a USB port on the set-top-box 102. The USB cable 112 only takes the power from the USB port on the set-top-box 102 and nothing else. The modulator 106 modulates the composite AV signals from cable 116 and outputs an AV signal on a coaxial output, to which a coaxial cable 108 is connected, and the coaxial cable 108 delivers the coaxial AV signal to the television set 118.

Because the modulator 106 takes power from the USB port on the set-top-box 102, the modulator 106 does not need to have a power conversion circuitry and also does not need to be supplied with a bulgy external power cord for connecting to the power outlet 114. Also, because the modulator 106 takes only two signals, one composite video signal and one composite audio signal, the cable 116 can be made simpler and the modulation circuit on the modulator 106 can also be made simpler. Thus, overall a low cost solution for supporting older television sets can be achieved.

Figure 2:
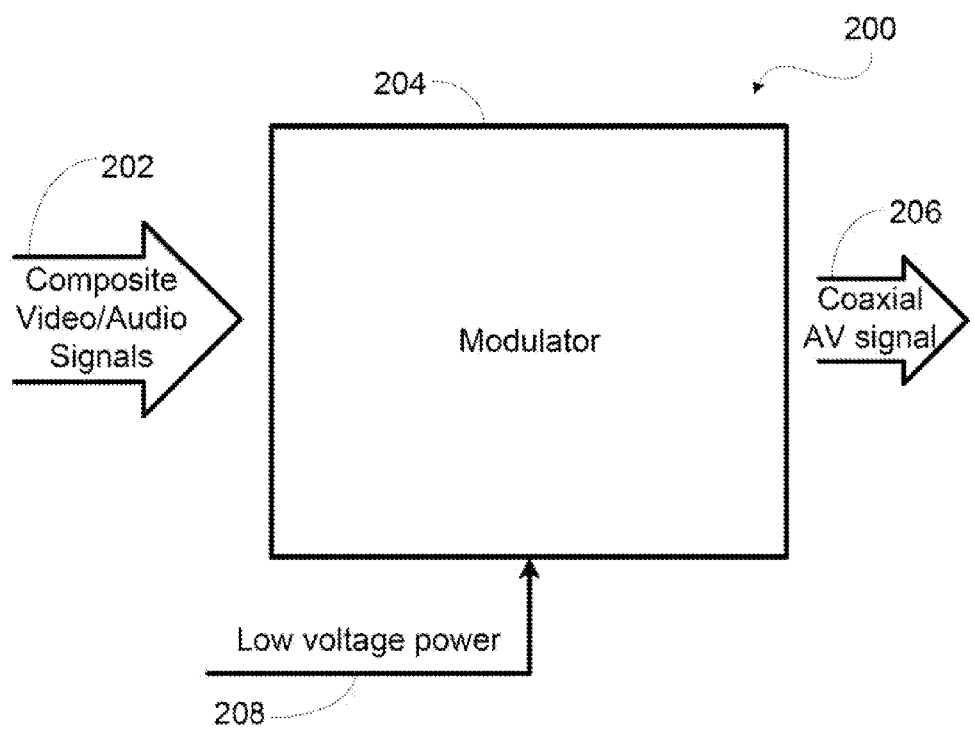
FIG. 2 illustrates architecture 200 of a radio signal modulator according to the present invention.

FIG. 2 is a block diagram 200 for a modulating circuit 204. The modulating circuit 204 receives composite AV signals, one video signal and one audio signal, and modulates the composite AV signals into a coaxial AV signal 206. The modulating circuit 204 can modulate and output the coaxial AV signal 206 on a carrier frequency selected from either channel 3 or channel 4 frequencies, or in any other frequency. The modulating circuit 204 is powered by low voltage DC power received through a USB input. The low voltage DC power received from the USB input can be used by the modulating circuit 204 without additional voltage adjustment. The modulating circuit also has a status indicating light 210, which will be one when the modulating circuit is powered. The status indicating light 210 may flash with different frequencies if the modulating circuit faces different problems.

Figure 3:
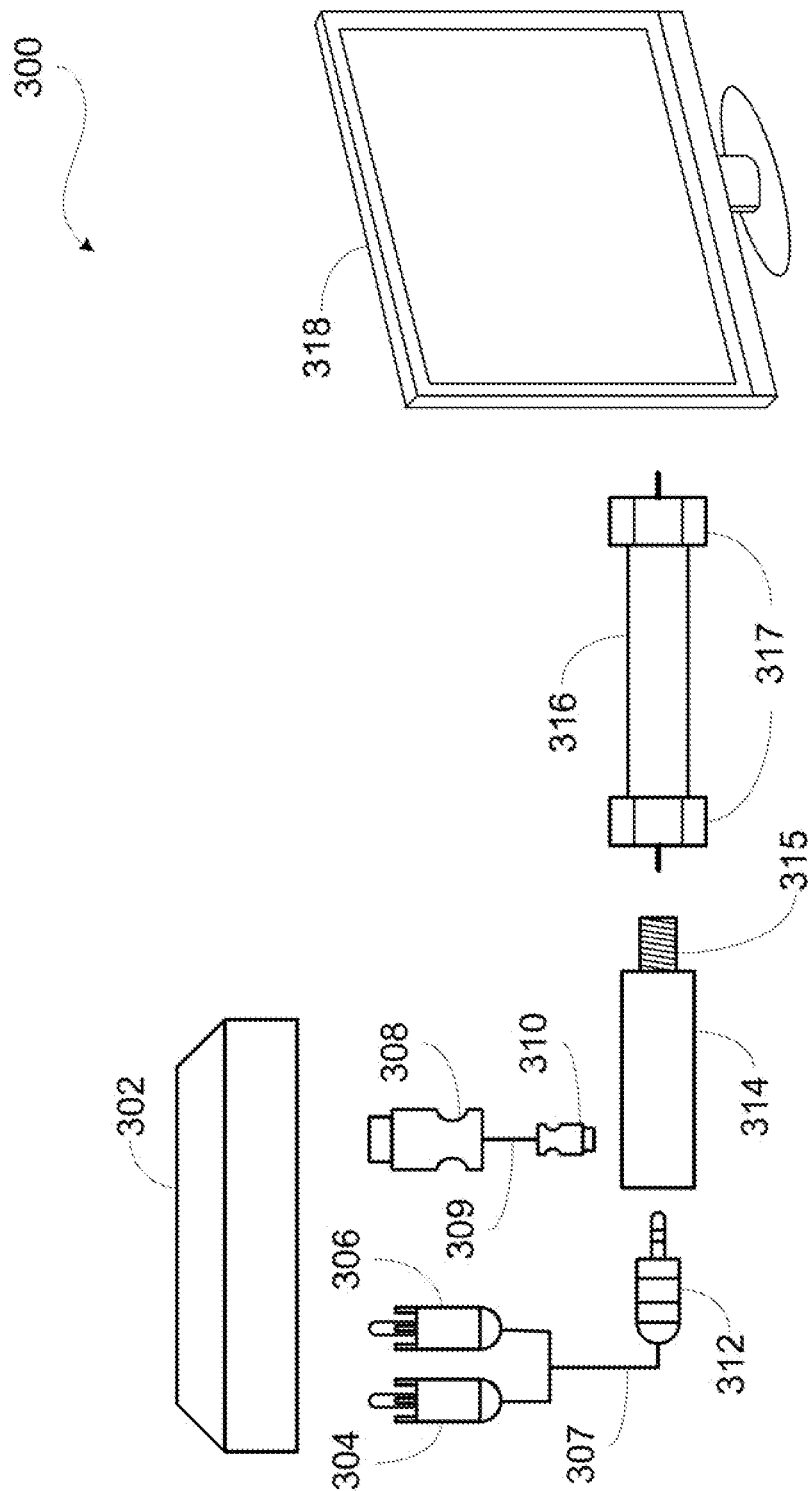
FIG. 3 is a schematic 300 of one embodiment of the present invention.

FIG. 3 is schematic 300 of an implementation of the present invention, A set-top-box 302 receives digital audio and video signal from an external source (not shown) that can be either a cable or a satellite dish. A cable 307 with one composite audio connector 304 and one composite video connector 306 on one end and a single tip connector 312 on the other end is connected between the set-top-box 302 and a modulator 314 according to the present invention. The composite audio connector 304 and composite video connector 306 connect respectively to the composite audio and video outputs on the set-top-box 302. For the set-top-box 302 with two composite audio outputs, L and R, the audio output can connect to either one of them. The single tip connector 312 is connected to an input on the modulator 314.

The modulator 314 has a single tip AV signal connector (not shown) for connecting the single tip AV connector 312 and a coaxial cable connector 315. The modulator 314 receives a low voltage DC power from an external source. The modulator 314 is specially designed to use the low voltage DC power available on a USB output connector (not shown) on the set-top-box 302. Because of the likely proximity between the set-top-box 302 and the modulator 314, a relatively short USB cable 309 with a standard size USB connector 308 on one end and a mini size USB 310 on the other end can be used to connect between the set-top-box 302 and the modulator 314 and to deliver the power from the set-top-box 302's USB output connector to the modulator 314. Use of a mini USB connector 310 enables the size of the modulator 314 to be minimized. The modulator 314 has a status indicating light (not shown in FIG. 3) that stays on when the modulator 314 is powered.

The modulator 314 also has a coaxial output connector 315 for delivering the coaxial AV signal to an older television set 318 through a coaxial cable 316. The modulator 314 has a carrier frequency selector (not shown) that allows a user to select the channel (or the carrier frequency) on which the coaxial AV signal is to be delivered on the coaxial output 315. The coaxial cable 316 has one coaxial connector 317 on each end. One end 317 of the coaxial cable 316 is connected to the modulator 314 and other end 317 of the coaxial cable 316 is connected to the coaxial input on the television set 318.

It is understood by those skilled in the art that a cable with three connectors, one for video and two for audio (L and R audio signals), on one end and a three-signal single tip connector on the other end may also be used in an alternative design, where the modulating circuit 204 is designed to module three signals into one single coaxial signal. The modulator 314 of the present invention can use a cable with two single tip AV connectors, one on each end, to connect to set-top-boxes that provide a single tip AV output connector.

Figure 4:
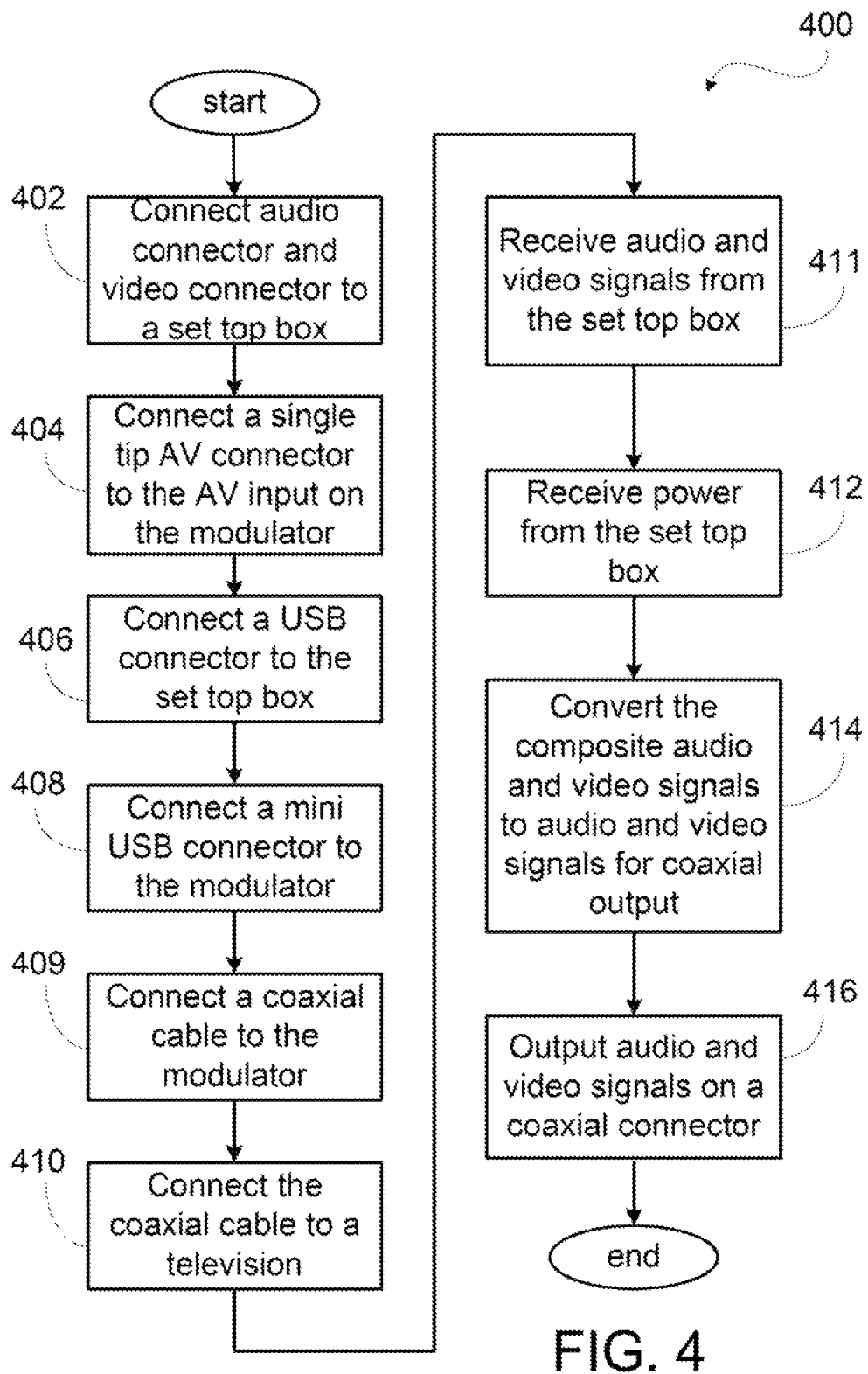
FIG. 4 is a flowchart 400 of a method according to the present invention.

FIG. 4 is a flowchart 400 of a method for delivering AV signal on a coaxial connector. A cable 307 with separate composite audio and video connectors are connected to the composite audio and video output connectors on a set-top-box 302, step 402 and other end of the cable with a single tip AV connector 312 is connected to the corresponding single tip AV input, step 404, on the modulator 314. A USB cable 309 is connected to the USB output on the set-top-box 302, step 406, and also connected to the mini USB input on the modulator 314, step 408. A carrier frequency, usually either channel 3 or channel 4, can also be selected. Finally, a coaxial cable 316 is connected to the coaxial output connector 315 on the modulator 314, step 409, and also to the coaxial input of a television 318, step 410.

After the external connections are made, the modulator 314 is powered and receives composite AV signals from the set-top-box 302, step 411, and the low voltage DC power is received also from the set-to-box 302, step 412. The modulator 314 modulates the composite AV signals into one AV signal in the coaxial format on a selected carrier frequency, step 414, and outputs a single AV signal on the coaxial connector 315, step 416. The single AV signal results from combination of two composite AV signals. The coaxial cable 316 then delivers the coaxial AV signal to the television set 318.

In the above description, the coaxial signal or coaxial AV signal generally means NTSC signal or other signal suitable for display on an older TV set transported on a coaxial cable. It is understood that the present invention is also applicable for converting digital AV signal other than digital TV signal, such as online interactive gaming AV signals, received from the subscription-based service providers into coaxial signal for display on the older TV set. The modulator of the present invention can also be used to convert composite audio and video signals from an IPTV (Internet Protocol Television) set-top-box to a coaxial AV signal for display on the older TV set. It is also understood that the low voltage DC voltage may also be received from the set-top-box through other suitable connectors.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims. It is understood that features shown in different figures can be easily combined within the scope of the invention.

What is claimed is:

1. A method, for modulating composite audio signal and video signal into an audio and video signal on a coaxial output, comprising the steps of:
    receiving, by a USB connector, a low voltage DC power from an external source;
    powering a modulating circuit by the low voltage DC power;
    receiving a composite audio signal to form a received audio signal;
    receiving a composite video signal to form a received video signal;
    modulating the received audio signal and the received video signal to form a combined audio and video signal; and
    outputting the combined audio and video signal on a coaxial output connector.

2. The method of claim 1, further comprising the step of receiving a carrier frequency selection.

3. The method of claim 2, wherein the combined audio and video signal is modulated onto a selected carrier frequency.

4. The method of claim 1, wherein the composite audio signal and composite video signal are received through a single tip pin.

5. The method of claim 1, wherein the composite audio signal and composite video signal are received from a set-top-box.

6. The method of claim 1, wherein the low voltage DC power are received through a USB connector on a set-top-box.

7. An apparatus, for modulating composite audio signal and video signal into an audio and video signal on a coaxial output, comprising:
    a USB input for receiving a low voltage DC power;
    an audio signal input for receiving an audio signal;
    a video signal input for receiving a video signal;
    a coaxial signal output; and
    a modulating circuit, powered by the low voltage DC power, for modulating the audio signal and the video signal into a combined audio and video signal and outputting the combined audio and video signal on the coaxial signal output.

8. The apparatus of claim 7, further comprising a mini USB connector connected to the USB input.

9. The apparatus of claim 7, further comprising a single tip AV receiver for receiving the audio signal and the video signal.

10. The apparatus of claim 9, wherein the single tip AV receiver receives one video signal and two audio signals.

11. The apparatus of claim 7, further comprising a carrier frequency selector.

12. A system, for modulating digital AV signals received from a subscription-based service onto a composite AV signal for displaying on a television set with only a coaxial input connector, comprising:
    a set-top-box for receiving the digital AV signals from an external source and for outputting a composite audio signal and a composite video signal, the set-top-box having a universal serial bus (USB) output connector; and
    a radio frequency (RF) modulator for receiving the composite audio signal and the composite video signal from the set-top-box and outputting a coaxial AV signal, the RF modulator comprises
        a single tip connector for receiving a single tip AV connector carrying the composite audio signal and the composite video signal,
        a mini USB input connector for connecting, through an external USB cable, to the USB output connector on the set-top-box, the RF modulator receives a low voltage DC power through the external USB cable from the USB output connector on the set-top-box and the RF modulator has no other power source,
        a modulating circuit for modulating the composite audio signal and the composite video signal into the coaxial AV signal, and
        a coaxial output connector for outputting the coaxial AV signal.

13. The system of claim 12, wherein the RF modulator further comprising a carrier frequency selector.

14. The system of claim 13, wherein the modulating circuit outputs the coaxial AV signal on a carrier frequency selected through the carrier frequency selector.

15. The system of claim 12, wherein the RF modulator further comprising a status indicator light.

16. The system of claim 12, wherein the composite audio signal further comprises a composite audio L signal and a composite audio R signal.

* * * * *